United States Patent [19]

Young

[11] 4,202,159
[45] May 13, 1980

[54] CONVEYOR FOR A COMBINE HARVESTER

[75] Inventor: John J. Young, Lincoln, Nebr.

[73] Assignee: The Goodyear Tire & Rubber Company, Akron, Ohio

[21] Appl. No.: 35,170

[22] Filed: May 2, 1979

Related U.S. Application Data

[63] Continuation of Ser. No. 811,404, Jun. 29, 1977, abandoned.

[51] Int. Cl.² ............... A01D 43/02; A01D 89/00
[52] U.S. Cl. .......................... 56/364; 56/400; 198/697
[58] Field of Search ............... 56/364, 400, 400.21; 198/697, 698, 699, 688

[56] References Cited

U.S. PATENT DOCUMENTS

| | | | |
|---|---|---|---|
| 2,385,829 | 10/1945 | Melroe | 56/364 |
| 2,400,667 | 5/1946 | Toews | 198/688 |
| 2,482,883 | 9/1949 | Thomas | 56/400 |
| 2,704,150 | 3/1955 | Scranton | 198/692 |
| 2,881,580 | 4/1959 | Ashton | 56/364 |
| 2,908,129 | 10/1959 | van der Lely et al. | 56/400 |
| 2,954,113 | 9/1960 | Hibbard et al. | 198/688 |
| 3,085,676 | 4/1963 | Hinchcliffe | 198/699 |
| 3,206,920 | 9/1965 | Hofer | 56/364 |
| 3,253,394 | 5/1966 | Johnston et al. | 56/400 |
| 3,935,697 | 2/1976 | Hofer | 56/400.21 |

Primary Examiner—Russell R. Kinsey
Assistant Examiner—Paul J. Hirsch
Attorney, Agent, or Firm—D. M. Ronyak

[57] ABSTRACT

A flexible endless conveyor for a combine harvester comprises a number of side-by-side elastomeric belts having a plurality of molded cleats on the surface of the belt, aligned in rows orthogonal with respect to the length of the belt, and interspaced by openings in the base of the belt between adjacent cleats of a row. Crop gathering tines are mounted in the openings and are carried by a rod positioned within bores molded into the cleats on an axis in line with the row of cleats across the width of the belt.

18 Claims, 5 Drawing Figures

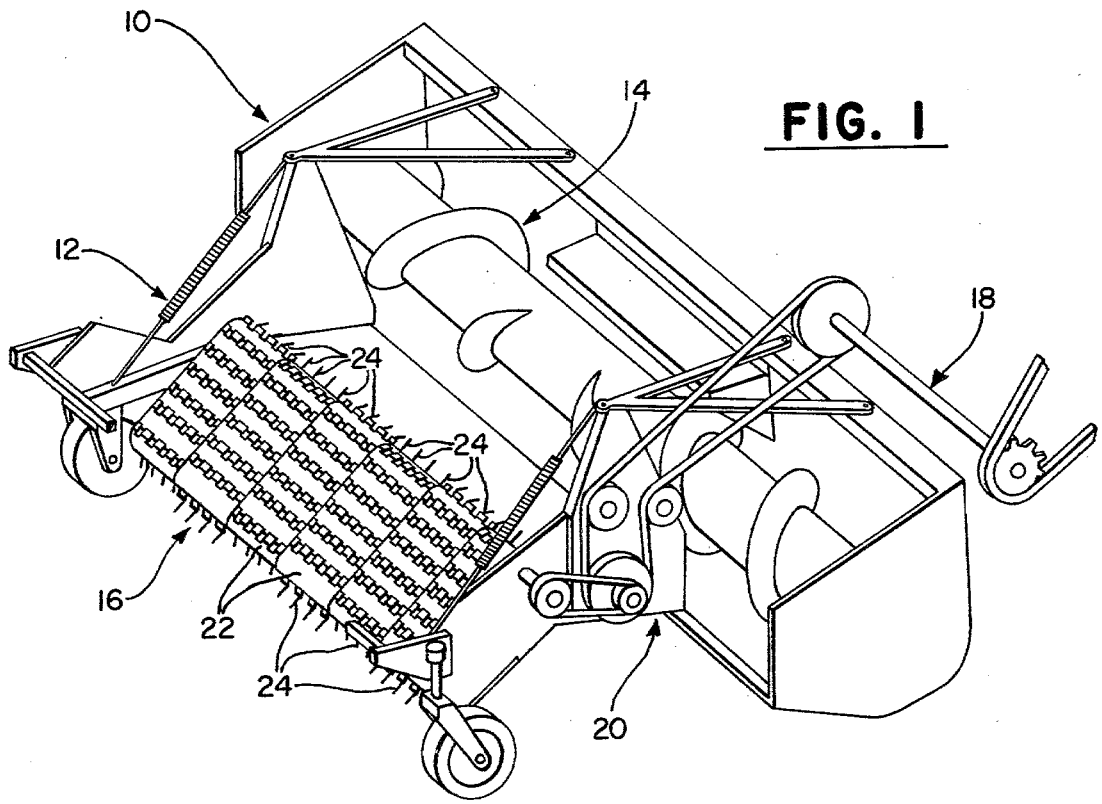
FIG. 1
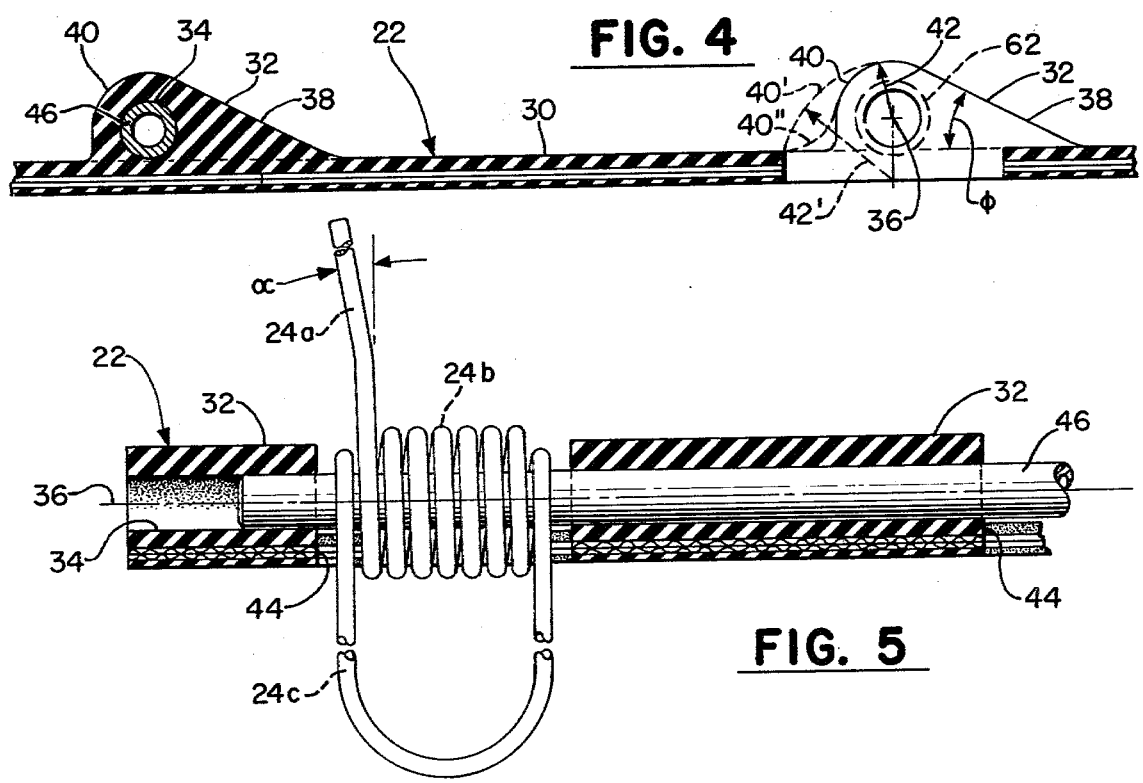
FIG. 4
FIG. 5

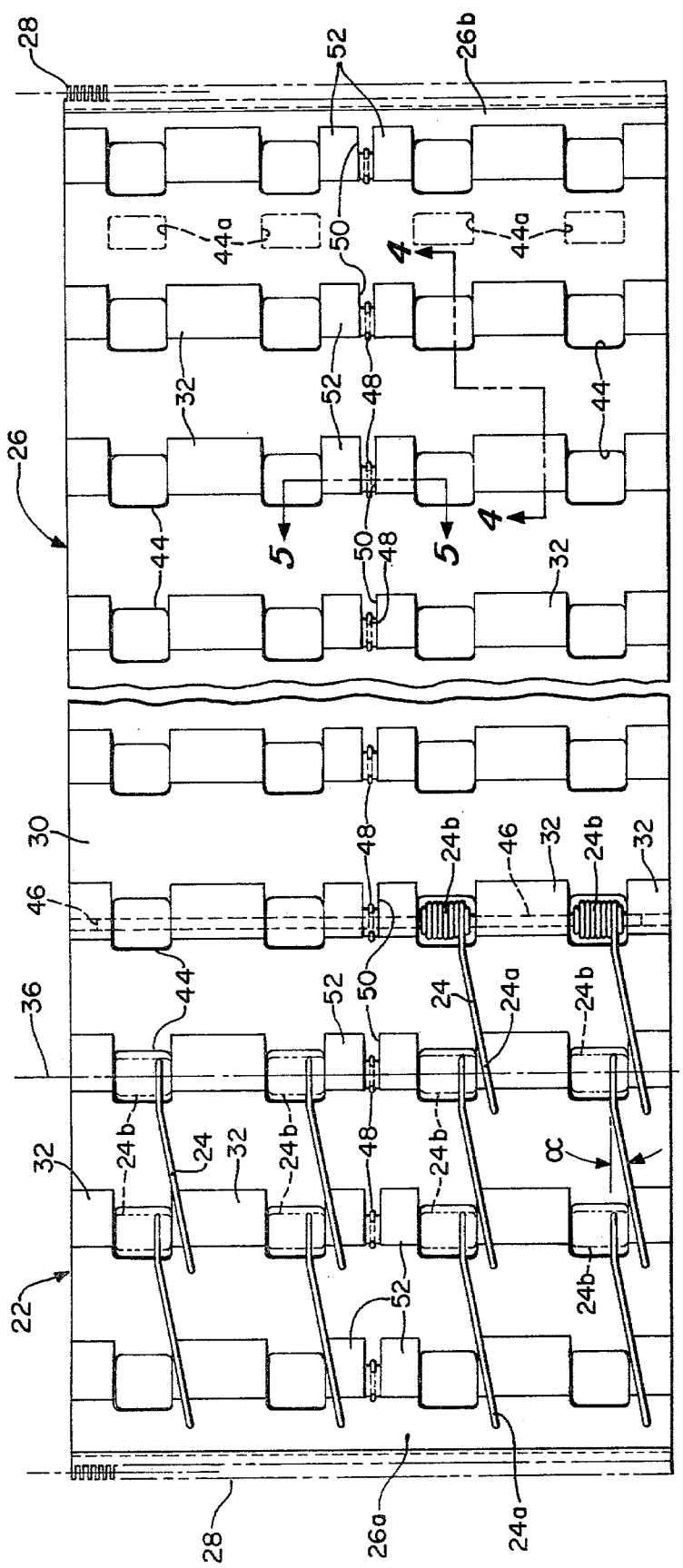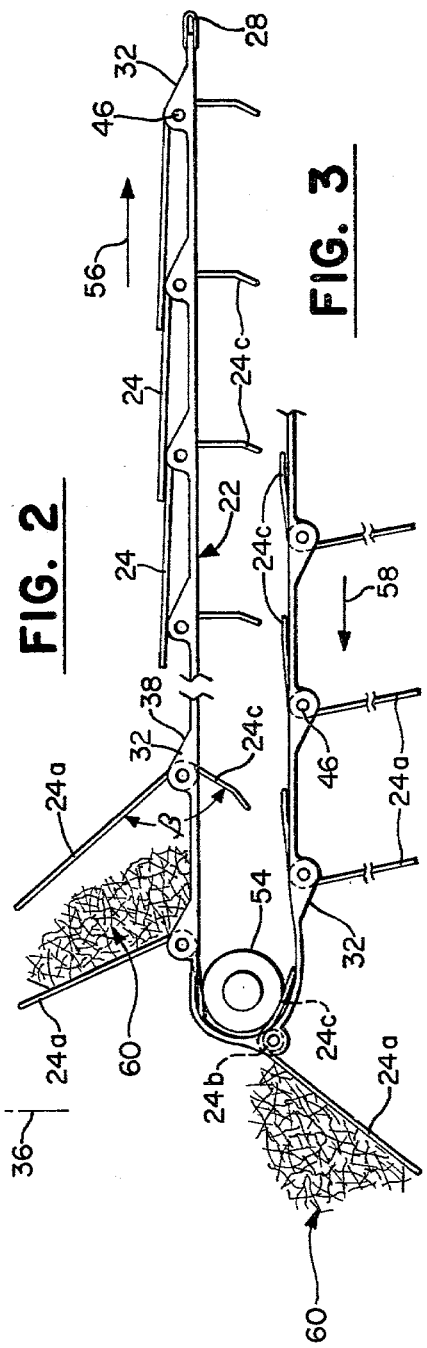

CONVEYOR FOR A COMBINE HARVESTER

This is a Continuation of application Ser. No. 811,404 filed June 29, 1977 now abandoned.

BACKGROUND OF THE INVENTION

This invention generally relates to combine harvesters and more particularly to an improved flexible belt conveyor for a draper pickup apron as may be used on windrow type farm machinery such as grain harvesters or combines.

There are many configurations of draper pickup aprons within the prior art and for each of these there are numerous other arrangements of apparatus for attaching the crop-gathering tines that are mounted on the pickup apron to carry the crop to the combine auger for baling and/or other processing. Most of these prior art conveyor configurations suffer from having a multiplicity of parts such as plates, brackets, fasteners, etc., that are used to fasten the tines to the flexible apron. In this circumstance, and upon breakage or loss of various of the tines and/or fasteners during the harvesting operation, down-time of these machines for replacement of the broken or lost parts is a costly proposition as the harvest must be completed within a specific period of time. Furthermore, these complex configurations of multiple parts offer more projections on the apron that cause hanging up of the grain stalks, vines, etc., which become entangled on the conveyor and must be periodically and manually removed.

In view of these and other problems associated with present draper type combine harvesters, an object of this invention is to provide a flexible belt conveyor that eliminates a multiplicity of fasteners and the like and provides a simple mechanism for attaching and detaching crop-gathering tines.

A further object of the invention is to provide a pickup belt for a combine harvester that offers simple maintenance and easy field removal of individual belts and/or replacement of broken or lost tines.

These objects and other objects and advantages are accomplished in a flexible endless conveyor for a harvester pickup apron comprising in combination: an elastomeric belt having a reinforced base and a plurality of molded-on elastomeric cleats, raised from the surface of the base and oriented in a plurality of rows across the width of the belt for the full length of the belt with adjacent cleats of a row interrupted by a space and an opening in the base of the belt in the area defined by the space between adjacent cleats, each of said cleats having a molded-through bore having an axis parallel to the base of the belt, the bore axes of cleats in a row being commonly aligned in a direction substantially orthogonal to the lengthwise direction of the belt; a rod mounted in each of the rows within the bores of the cleats in a row; and a plurality of flexible tines mounted on the rods within the openings in the base of the belt between adjacent cleats of a row.

DESCRIPTION OF THE DRAWINGS

The features and advantages of the invention will be better understood from a consideration of the following description when taken in conjunction with the accompanying drawings in which:

FIG. 1 is a perspective view of the forward end of a harvester platform on which is mounted a draper pickup conveyor embodying the instant invention;

FIG. 2 is a plan view of one of the belts comprising the conveyor showing several of the crop-gathering tines mounted on the belt;

FIG. 3 is a side elevational view illustrating the action of the belt/tine combination as the belt traverses a pulley;

FIG. 4 is an enlarged elevational view partially in section taken on line 4—4 of FIG. 2; and FIG. 5 is an enlarged elevational view partially in section taken on line 5—5 of FIG. 2.

BRIEF DESCRIPTION OF THE INVENTION

Referring to FIG. 1 of the drawings, the forward end of a combine harvester is generally indicated by reference numeral 10 and for the purpose of this invention includes a draper pickup assembly 12 for gathering crops and feeding them into the area of a conventional harvester auger 14. The pickup assembly 12 includes a flexible conveyor generally indicated by numeral 16 that is driven off of the combine power via a jackshaft sprocket 18 and a belt/pulley arrangement 20. The conveyor 16 generally comprises a series of side-by-side mounted flexible belts 22 which carry a plurality of crop-gathering tines 24 on the surface and which effect pickup of the crop as the belts rotate and the harvester moves in a forward direction. Draper pickup attachments for combine harvesters of the type described are manufactured by the Melroe Division of The Clark Equipment Company, Gwinner, North Dakota.

Referring to FIGS. 2 through 5 of the drawings, the specific structure of the conveyor will be described. As herebefore mentioned the pickup conveyor comprises a series of side-by-side belts 22. Each belt 22 is formed of a section 26 having its ends 26a and 26b coupled together via wire lacing, hooks, or staples 28, to form a continuous loop. Alternately, the belts 22 may be made and vulcanized into endless loops via well-known and recognized methods in the belt art. Furthermore, for very long lengths of belt, the sections 26 may be made longer or multiple sections 26 may be laced together depending upon the length of each such section 26 and the desired mounted length of each belt 22 and, therefore, the invention is not considered limited by the length of either the sections 26 or the length of the belt 22.

To continue, a belt section 26 comprises a molded reinforced elastomeric base 30 and a plurality of molded-on elastomeric cleats 32 positioned in periodic rows along the length of the section 26. The belt material may comprise, for example, a square woven fabric of polyester or other stable fiber embedded in a suitable elastomer, the particular combination of fiber and elastomer being within the skill of those persons knowledgeable of the art. The cleats 32 are characterized by molded-through, horizontal bores 34 having an axis 36 in a substantially orthogonal orientation to the lengthwise direction of the belt section 26. The drawing of FIG. 2 shows a belt section 26 having three full cleats 32 across the width of the section and two partial width end cleats 32a. The number of full cleats, of course, will depend upon the desired final width of the section, a lesser number for a narrower section and a greater number for a wider section. The cleats 32 are further characterized by a sloping leading edge 38 having an angle $\phi$ of approximately 15° to 45° with respect to the belt base 30 and terminating in a trailing edge 40 having a radius 42 centered on the cleat bore axis 36. The trailing edge may alternately have a larger radius as for example, indicated at 42' to provide a larger rearward stress-relieving portion as defined by the arc 40' and/or may be filleted as indicated by reference numeral 40" in FIG. 4. Positioned between each pair adjacent cleats 32 and centered on the axis 36 of the cleat bore 34, is a punched-through or molded-in opening 44 through the base 30 of the belt. The openings 44 facilitate mounting of the tines 24 as will be clearly understood hereinafter.

Mounting of the crop-gathering tines 24 on the belt section 26 is accomplished by positioning the tines within the openings 44 between the cleats and sliding a rod 46 through the cleat bore 34 across the width of the belt while loading each tine on the rod as it passes through the area of the openings 44. The rod 46 is maintained in a centered position between the ends of the belt by a fastener 48 such as a cotter pin or the like inserted through the center of the rod by way of an opening 50 in a centrally located cleat 52.

The tines 24 are of a heavy gauge spring steel of the type known and used in the art but are characterized by the crop-engaging portion 24a being bent at an angle $\alpha$ away from the centerline of the belt 22. This angular relationship of the tine portion 24a eliminates any interference between tines of the succeeding row since the tine mounting positions are in rows along the length of the belt. It will be recognized, of course, that the tines in alternating rows may be staggered and in this way the tine ends 24a need not be angled but may extend straight-away from their mounting positions. In either case, the tines 24 are further characterized by a coiled portion 24b that has a bore diameter for readily mounting on the rod 46 and a looped portion 24c that extends away from the coiled portion 24b at an approximate angle $\beta$ of between 80° to 110° with reference to the tine portion 24a as clearly shown in FIG. 3 of the drawing.

In operation of the conveyor, a belt 22 traverses a forward pulley 54 (shown in FIG. 3) and a rearward pulley (not shown) moving in the direction of arrows 56 toward the combine auger. Upon dumping the crop, the belt moves in a forwardly direction indicated by arrows 58 to engage and pick up the crop 60. As clearly shown in the drawing, the tines 24 depend downwardly in a crop-engaging action and have the ability to conform to the terrain or obstructions on the surface thereof because they are not rigidly mounted on the belt but may swivel about the rod 46. However, upon the looped portion 24c of the tine engaging the forward pulley 54, the tine is held rigidly between the pulley surface and the belt while it lifts the crop onto the conveyor belt surface. After the looped portion 24c leaves the engagement with the pulley 54, the tines may again swivel to a laying position on the belt. In this position, the crop-engaging portion 24a being bent an angle $\alpha$, may rest on the cleat in the following row as shown in FIG. 2 and thus be in a position so as not to interfere with the tines of that row.

While the conveyor belt configuration herebefore described will meet the needs of most crop-gathering applications, there may be instances where it may be necessary to reinforce the cleat bores 34. In this circumstance, it is contemplated that metal bushings may be vulcanized within the elastomer of the cleat as shown in FIG. 4 by the dashed line indication 62. The rod 46 will, therefore, be carried by the bushings 62 embedded in each cleat and may be maintained in a centralized position by spring-lock washers or the like mounted on the rod 46 at the position of the two outboard openings 44 within a row. Further, it may be desirous to provide increased belt flexibility and in this instance additional openings 44a may be punched or molded into the base 30. The additional openings relieve the pressure between the belt and the tine portion 24c as it passes around the pulley 54.

While certain representative embodiments and details have been shown for the purpose of illustrating the invention, it will be apparent to those skilled in the art that various changes and modifications may be made therein without departing from the spirit or scope of the invention.

What is claimed is:

1. A flexible endless conveyor for a harvester pickup apron comprising in combination:
   an elastomeric belt having a reinforced base and a plurality of integrally molded elastomeric cleats, raised from the surface of the base and oriented in a plurality of rows across the width of the belt for the full length of the belt with adjacent cleats of a row interrupted by a space and an opening in the base of the belt in the area defined by the space between adjacent cleats, each of said cleats having a bore therethrough having an axis parallel to the base of the belt, the bores of cleats in a row being aligned in a direction substantially orthogonal to the lenghtwise direction of the belt;
   a rod mounted in each of the rows within the bores of the cleats in a row; and
   a plurality of flexible tines mounted on the rods within the openings in the base of the belt between adjacent cleats of a row, said tines each having a coiled portion having a bore through which one of said rods extends.

2. The conveyor as set forth in claim 1, wherein the openings in the base of the belt are molded-through openings aligned in rows parallel to the length of the belt.

3. The conveyor as set forth in claim 1, wherein the openings in every other row across the width of the belt are staggered such that in rows parallel to the length of the belt, cleats and openings are alternated.

4. The conveyor as set forth in claim 2, wherein the tines each include a portion bent at an angle away from the centerline of the belt such that tines in successive rows do not interfere with one another, while the axes of the bores of the coiled portions of the tines extend substantially in the transverse direction of the belt.

5. The conveyor as set forth in claim 1, wherein one cleat in each of the rows is located on the centerline of the belt, said cleat having a molded-in access hole to the cleat bore for positioning a fastener on the rod to maintain the rod in a centered position between the sides of the belt.

6. The conveyor as set forth in claim 5, wherein each row terminates at the sides of the belt in a cleat and the rod is positioned within the cleat bores such as not to extend beyond the edges of the belt.

7. The conveyor as set forth in claim 1, wherein the belt has defined forward and reverse directions and the cleats are shaped with sloping leading edges in the forward direction of the belt.

8. The conveyor as set forth in claim 7, wherein the angle of the sloping leading edges is between 15 and 45 degrees with respect to the surface of the belt.

9. The conveyor as set forth in claim 1, wherein metal bushings are molded into the bores of the cleats, said rod being carried by the bushings and retained in position by fasteners mounted on the rod within the openings on the belt closest to either side of the belt.

10. The conveyor as set forth in claim 1, wherein the openings are punched-through openings aligned in rows parallel to the length of the belt.

11. The conveyor as set forth in claim 1, wherein the tines comprise spring steel wire having a crop-gathering end terminating in a coiled mid-portion and a looped end extending away from the mid-portion at an angle of between 80 and 110 degrees with respect to the crop-gathering end.

12. The conveyor as set forth in claim 11, wherein the tines are able to rotate about the rod within the angle between their ends.

13. An endless flexible conveyor belt for a harvester pickup apron comprising:
a reinforced elastomeric base having a plurality of integrally molded and raised elastomeric cleats, oriented in a plurality of rows across the width of the belt for the full length of the belt and adjacent cleats of a row interrupted by a space and an opening in the base of the belt in the area defined by the space between adjacent cleats, each of said cleats having a bore therethrough having an axis parallel to the base of the belt, the bores of the cleats in a row being aligned in a direction orthogonal to the lengthwise direction of the belt.

14. The belt as set forth in claim 13, wherein the belt has defined forward and reverse directions and the cleats are characterized by sloping leading edges in the forward direction of the belt.

15. The belt as set forth in claim 13, wherein metal bushings are molded in the bores of the cleats.

16. The belt as set forth in claim 14, wherein the sloping leading edges define an angle with respect to the surface of the belt within the range of 15 to 45 degrees.

17. The belt as set forth in claim 13, wherein the openings in the base are molded-through openings.

18. The belt as set forth in claim 13, wherein the openings in the base are punched-through openings.

* * * * *